(12) United States Patent
Brown (10) Patent No.: US 9,911,105 B1
(45) Date of Patent: Mar. 6, 2018

(54) SYNCING MEDIA CONTENT (71) Applicant: Amazon Technologies, Inc., Reno, NV (US)

(72) Inventor: Richard Charles Brown, London (GB)

(73) Assignee: Amazon Technologies, Inc., Seattle, WA (US)

( * ) Notice: Subject to any disclaimer, the term of this patent is extended or adjusted under 35 U.S.C. 154(b) by 717 days.

(21) Appl. No.: 14/069,053

(22) Filed: Oct. 31, 2013

(51) Int. Cl.
*G06Q 20/12* (2012.01)
*H04L 29/06* (2006.01)
*G06F 15/16* (2006.01)

(52) U.S. Cl.
CPC ......... *G06Q 20/123* (2013.01); *H04L 65/602* (2013.01)

(58) Field of Classification Search
USPC .......................................................... 705/26
See application file for complete search history.

(56) References Cited

U.S. PATENT DOCUMENTS 8,700,804 B1 * 4/2014 Meyers ............... H04L 67/1095
709/217
8,930,438 B2 * 1/2015 Williamson ............ H04W 4/02
709/203

* cited by examiner

*Primary Examiner* — Garcia Ade
(74) *Attorney, Agent, or Firm* — Thorpe North & Western, LLP.

(57) ABSTRACT

Technology is described for receiving a portion of the media content. A media content item associated with the portion of media content may be identified. A location marker may be generated for the media content item that corresponds to the portion of media content.

20 Claims, 9 Drawing Sheets

SYNCING MEDIA CONTENT

BACKGROUND

A user may consume and interact with numerous types of media content. For example, the user may listen to songs and audio books, watch movies and television programs, read books, magazines, and newspapers, play electronic games, etc. In addition, the user may interact with the media content using a variety of electronic devices, such as mobile devices, tablet computers, e-book readers, laptops, televisions, desktop computers, etc. The electronic devices may allow the user to interact with digital versions of the media content. Additionally, the user may interact with print versions of the media content, such as books, magazines, newspapers, etc.

An electronic retail store may include a catalog of books, movies, music, etc. The user may purchase or rent digital versions of the media content at the electronic retail store. For example, the user may stream a movie to their electronic device. As additional examples, the user may listen to an audio song or read a digital book that has been downloaded onto their electronic device. By comparison, brick and mortar stores may sell physical copies of the media content, such as print books, print magazines, physical copies of digital video disk (DVD) movies and audio compact discs (CDs). A user may desire to purchase and consume media content in any one of these many various formats.

DETAILED DESCRIPTION

Technology is described for providing media content with a location marker generated using a captured portion of the media content. For example, the user may watch a portion of a video at a sports pub or listen to songs at a restaurant and may desire to have further access to the media content at the same point in the video or song where the user last left off viewing or listening upon exiting the sports pub or restaurant.

The user may interact with digital media content (e.g., the video at the sports pub) by capturing a portion of the media content using the electronic device. The user may capture the portion of media content using a media capturing application installed on an electronic device or mobile device (e.g., a cell phone or tablet). As an example, the user may capture a video portion and/or an audio portion of the digital media content (e.g., a 15 second audio clip of the video) using the electronic device. As another example, the user may photograph or scan a page from a print book (e.g., page 79) using the electronic device. In one example, the electronic device may include an audio recorder (i.e., a microphone), image recorder (i.e., a camera), or a video recorder to capture the portion of media content.

The user device may send the portion of media content to an application or application server. The application server may analyze the portion of media content in order to identify media content items that correspond to the portion of media content. For example, a digital book may be identified that contains the same text in the portion of the media content captured by the camera.

In one example, a location marker may be generated for the media content item. The term "location marker" may generally refer to a location for the media content item that corresponds to the portion of media content. More specifically, the location marker may reference a particular time and/or position within the media content item. In a specific example, the marker may indicate a particular scene or place in the media content item (e.g., 0:58:13 of a movie or page 345 of a book) corresponding to the portion of media content captured by the user (e.g., page 345 of the book). In one example, the location marker may be a bookmark that references a particular page number or location in a digital book that corresponds to the portion of media content captured by the user. Alternatively, the location marker may reference a marker that is located proximate to the time marker. So, the marker may be adjusted to be located at a beginning of a movie chapter that includes the timer marker 0:58:13, the beginning of the movie chapter following the time marker 0:58:13, or a beginning of a book chapter that includes the page 345.

The type of analysis performed on the portion of media content to identify the media content item may depend on the file format of the portion of media content. For example, optical character recognition (OCR) or similar techniques may be performed with an image file containing the plurality of characters. The plurality of characters included in the image file may be identified and compared with a database of media content items in a digital text format. The media content item (e.g., a digital book) that includes the matching plurality of characters may be identified from the database of media content items. As another example, audio recognition or similar techniques may be performed with respect to the audio file. An acoustic fingerprint may be created from the audio file. The acoustic fingerprint may be compared with a database of media content items in an audio format, and the media content item that includes the same acoustic fingerprint may be identified. As yet another example, video recognition or similar techniques may be performed with respect to the video file. A video fingerprint may be created from the video file of the portion of the media content. The video fingerprint may be compared with a data store of media content items in a video format, and the media content item that includes the same video fingerprint may be identified.

The media content item may be provided to the user at the location referenced by the location marker. Therefore, the user may continue interacting with the media content at the location where the user left off. In other words, the media content may be marked to match the point identified in the portion of media content. For example, the bookmark may mark the user's current location (e.g., point last accessed or consumed) within the media content item, so that the user may seamlessly transition from reading a print book to reading the same book in a digital version. As another example, the user may seamlessly transition from watching a television show at a sports bar to watching the same television show at home. In one example, the media content item may be provided to the same device that captures the portion of media content (e.g., a media capturing device), or alternatively, the media content item may be provided to a separate device.

Figure 1:
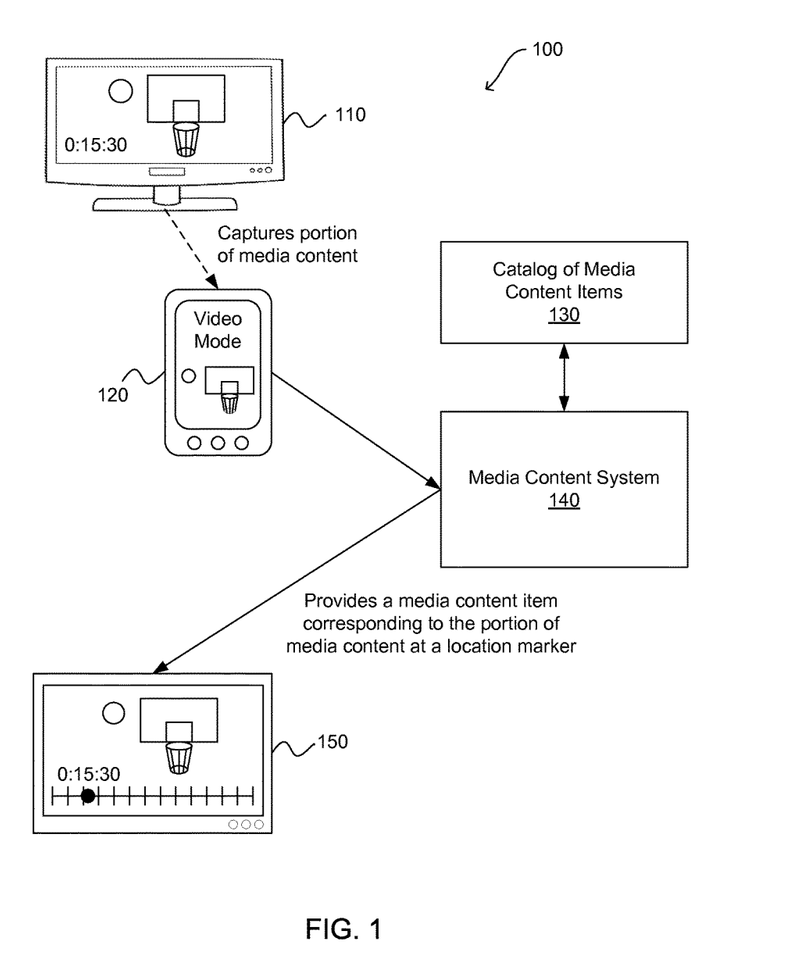
FIG. 1 is a system for capturing a portion of media content and providing a media content item with a location marker using the portion of media content according to an example of the present technology.

FIG. 1 illustrates an exemplary system 100 for capturing a portion of media content and providing a media content item at a location using the portion of media content. A video display 110 may be playing a sporting event (e.g., a basketball game) at a sports venue. A patron at the sports venue may be watching the basketball game, but realizes that he needs to stop watching the basketball game to attend to other commitments. However, the patron may be able to watch the basketball game at a later time on a television 150 at home. The patron may capture a snippet (e.g., 15 seconds) of the basketball game using a media capturing device 120 (e.g., a cell phone or tablet). In other words, the patron may capture the portion of media content.

The media capturing device 120 may use an application or program to communicate the portion of media content to a media content system 140. The media content system 140 may receive the portion of media content. The media content system 140 may identify a media content item that corresponds to the portion of media content. For example, the media content system 140 may perform video recognition with the video snippet to create a video fingerprint of the video snippet. The media content provider may compare the video fingerprint to a catalog of media content items 130. The media content system 140 may identify the media content item (e.g., the recorded basketball game) from the catalog that contains the same video fingerprint as the video snippet. In one configuration, the user may provide key words with the portion of media content to speed up the identification process. For example, the user may provide a snippet of a television show along with the name of the television show. As another example, the user may provide an image of a book page along with the author's name and/or keywords describing the book. Thus, the search domain may be narrowed for increased speed and efficiency when searching for the media content item.

In addition, the media content system 140 may generate a location marker in the media content item that corresponds to the video snippet captured by the patron. For example, the location maker may correspond to a time marker of 0:15:30 in the basketball game. Thus, the media content system 140 may provide the media content item at the location marker. Therefore, the patron may resume watching the basketball game starting from the time marker of 0:15:30 on the television 150 as received from the media content system 140. In one configuration, the media content system 140 may include a plurality of computing devices. For example, a first computing device may identify the media content item that corresponds to the portion of media content and a second computing device may provide the media content item at the location marker.

Users may interact with media content in a variety of ways (e.g., reading a print book, reading digital version of the book, watching a movie at a friend's house, watching the movie on the user's mobile device, listening to songs at a restaurant, listening to songs on the user's laptop computer, etc.). However, it may be difficult for users to switch from interacting with media content in one format to interacting with the same media content in another format. For example, the user may occasionally read a print version of a book, but may also read a digital version of the same book (e.g., when commuting to work on a train). However, when switching from the print version of the book to the digital version, the user's position in the digital version may not be synchronized with what the user is reading in the print version. In other words, the user may expend energy and time remembering the last page or section read in the printed book and/or flipping through the digital version to locate the last page or section read. Therefore, capturing the last page of the book read in the print version and generating a bookmark pointing to that page may allow the user to seamlessly continue reading the book in the digital version. As another example, the user may watch half a movie at a friend's house and desire to watch the remaining half at home. Instead of the user writing down the name of the movie and then searching for that movie at the electronic retail store, the user may simply upload a snippet of the movie and the movie may be accessible on the user's watch list. In addition, the movie may include a location marker so that the user may resume watching the movie from where the user left off.

In one configuration, the media content item may be added to a list of the user's interest items. The user's interest items may include media content items that the user has previously interacted with or desires to interact with in the future. When the user captures a portion of media content, the corresponding media content item may be added to the user's interest items. In a more specific example, the user's interest items may be added to a watch list. The watch list may indicate books, movies, television programs, etc. that the user desires to interact with in the future. The watch list may be categorized by the media content items that the user has already purchased, and the media content items that the user can interact with upon purchase. In addition, the watch list may include advertisements or recommendations related to the media content items.

In one example, the user may interact with the media content item upon purchasing the media content item. The user may scan or capture the portion of media content (e.g., a television show), and the media content item associated with the portion of media content may be identified from the catalog of media content items. In order to further interact with the media content item at a location corresponding to the portion of media content, the user may purchase or rent the media content item. Alternatively, the user may already own the media content item. For example, the user may own both a print version and a digital version of the same book. However, the user leaves the print version of the book on their nightstand and reads the digital version of the book when commuting to work. Thus, the user may scan the book page when done reading for the night, and the digital version of the book may be automatically synchronized to the book page using a bookmark. Thus, when the user opens the digital version of the book on their device, the user may automatically continue reading from the last read page.

In addition, the user may be notified of related media content items that are available at an electronic retail store. A specific recommendation may be made to a user based on what the user is currently reading, watching or consuming. These recommendations may even be focused based on the portion of a media item that a user is consuming. For example, if a user is watching a cooking show, a target ad may be provided about local cooking classes.

Figure 2:
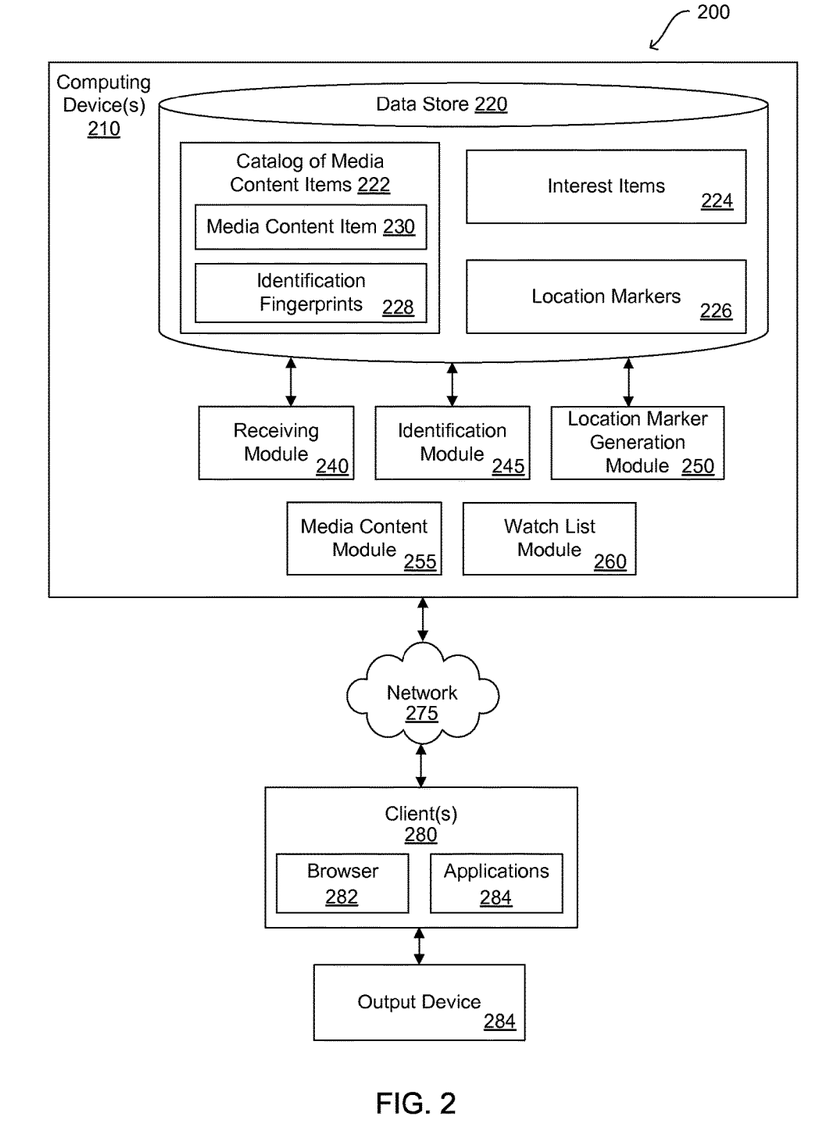
FIG. 2 is an illustration of a networked system for providing media content according to an example of the present technology.

In the following discussion, a general description of an example system for capturing a portion of media content and providing a media content item with a location marker using the portion of media content and the system's components are provided. The general description is followed by a discussion of the operation of the components in a system for the technology. FIG. 2 shows a networked environment 200 according to one example of the present technology. The networked environment 200 may include one or more computing devices 210 in data communication with a client 280 by way of a network 275. The network 275 may include the Internet, intranets, extranets, wide area networks (WANs), local area networks (LANs), wired networks, wireless networks, or other suitable networks, etc., or any combination of two or more such networks.

Various applications and/or other functionality may be executed in the computing device 210 according to various embodiments. Also, various data may be stored in a data store 220 that is accessible to the computing device 210. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data stored in the data store 220, for example, may be associated with the operation of the various applications and/or functional entities described below.

The data stored in the data store 220 may include a catalog of media content items 222. The catalog of media content items 222 may be associated with an electronic retail store or a content provider. The catalog of media content items 222 may include digital versions of songs, videos, television shows, books, magazines, newspapers, etc. In addition, the catalog of media content items 222 may include text or images for the print versions of books, magazines, newspapers, etc. The digital versions of the songs and videos may be associated with an audio fingerprint, a video fingerprint, text fingerprint, etc., so that particular media content items 230 (e.g., songs, text, videos, etc.) may be identified from the catalog of media content items 222.

The data stored in the data store 220 may include interest items 224. The interest items 224 may include a list of media content items 230 (e.g., books, television programs, songs) that are identified from the catalog of media content items 222. There may be multiple interest item lists for each user or for groups of users. The interest items 224 may include media content items 230 that the user has interacted with in the past and presumably wishes to further interact with in the future. The interest items 224 may include media content items 230 that the user previously captured a portion of using a device. For example, the interest items 224 may include a particular song that corresponds to an audio snippet previously captured by the user. In one example, the interest items 224 may be included in a watch list. For instance, a user may put videos in the watch list that the user desires to watch later. The watch list may be accessed by the user for interacting with the media content items 230 that interest the user. In one example, the interest items 224 may be categorized by the media content items 230 that have been purchased, and the media content items 230 that the user can interact with upon purchase. The interest items 224 may be accessible from a user device, such as a mobile device or a tablet computer.

The data stored in the data store 220 may include location markers 226. The location markers 226 may be associated with the user's interest items 224 and/or media content items 230 in the catalog of media content items 222. In one example, the location markers 226 may include bookmarks that are associated with a location in a book. Additionally, each of the user's interest items 224 may include at least one location marker 226. Thus, the location markers 226 may be associated with digital versions of books, newspapers, songs, movies, etc. The location markers 226 may point to a particular location within the interest item 224. For example, the location may include a time marker in a song or movie, or a page number in a digital book or magazine. Specifically, the location marker 226 may correspond to the portion of media content captured by the user's device (e.g., page 51 of a print book). Therefore, the location marker 226 may enable the user to seamlessly transition from reading the print book to reading the digital book. As another example, the location marker 226 may enable the user to seamlessly transition from watching a portion of a movie at a friend's home to watching the remainder of the movie at the user's own home.

The data stored in the data store 220 may include identification fingerprints 228. The identification fingerprints 228 may be used to analyze the portion of media content captured by the user device. The identification fingerprints 228 may include audio or acoustic fingerprints of media content items containing audio. In general, the audio fingerprint may be a digital summary of audio attributes that are deterministically generated from an audio signal. The digital summary may include a virtual map of peaks and feature points of the audio attributes using parameters, such as frequency, intensity, and time. In addition, the identification fingerprints 228 may include video fingerprints of media content items containing video. In general, the video fingerprint may be created based on a number of visual video features including, but not limited to, key frame analysis, color and motion changes during a video sequence, transitions, etc.

The components executed on the computing device 210 may include a receiving module 240, an identification module 245, a location marker generation module 250, a media content module 255, a watch list module 260, and other applications, services, processes, systems, engines, or functionality not discussed in detail herein. Alternatively, one or more of the modules 240, 245, 250, 255 and 260 may be included on a computing device associated with a third party. The receiving module 240 may be configured to receive a portion of media content. The receiving module 240 may receive the portion of media content as an audio file, a video file, an image file containing a plurality of characters, etc. The portion of the media content may be a defined size or length, such as 10-15 seconds of audio or video content or two pages of a text document. In one example, the receiving module 240 may receive the portion of media content from a media capturing device (e.g., a client 280) having a microphone or a camera, such as a mobile phone or tablet computer. In one example, the receiving module 240 may receive the portion of media content via an application or program installed on the media capturing device.

The identification module 245 may be configured to identify a media content item 230 from the catalog of media content items 222 using the portion of media content. The identification module 245 may analyze the portion of media content using techniques including, but not limited to, video recognition, audio recognition, and optical character recognition (OCR) and other useful pattern recognition technologies. The identification module 245 may determine the technique to use for analyzing the portion of media content based on a file format associated with the portion of media content (e.g., audio file, video file). When the portion of media content is an image file containing a plurality of characters, the identification module 245 may use OCR to identify text from the image file. Alternatively, the identification module 245 may create an audio fingerprint using audio recognition when the portion of media content is an audio file. In an additional example, the identification module 245 may create a video fingerprint using video recognition when the portion of media content is a video file. The identification module 245 may compare the portion of media content (i.e., the text associated with the image file, the audio fingerprint associated with the audio file, the video fingerprint associated with the video file) to the identification fingerprints 228 associated with a plurality of media content items 230. The identification module 245 may identify the media content item 230 in the catalog of media content items 222 using the portion of media content. In other words, the identification module 245 may identify the media content item 230 that contains the text, audio fingerprint, video fingerprint, etc. of the portion of media content.

The location marker generation module 250 may be configured to generate a location marker in the media content item 230 to indicate a location within the media content item 230 that corresponds to the portion of media content. For example, the portion of media content may indicate that the user watched a particular movie at a time marker of 33:56. Thus, the location marker generation module 250 may generate a corresponding location marker in the movie (i.e., at the time marker of 33:56). Alternatively, the location marker generation module 250 may generate the location marker in proximity to the portion of media content. For example, the portion of media content may indicate that the user watched a particular chapter in the movie (e.g., chapter 6). Thus, the location marker generation module 250 may generate the location marker pointing to that particular chapter or a subsequent chapter (i.e., the location marker may point to the beginning of chapter 6 or chapter 7).

The media content module 255 may be configured to provide the media content item 230 starting from the location marker to a user device. In other words, the location within the media content item may be synced to the portion of media content and the media content item may be provided via download, streaming, or another distribution technology. The user device may include a tablet computer, a mobile phone, a desktop computer, a smart television, a gaming system, etc. In one example, the user device may be the same device as the media capturing device, or alternatively, the user device and the media capturing device may be separate devices. In one example, the media content module 255 may provide the media content item 230 at the location marker in response to receiving a payment for purchase or rental of the media content item 230. For example, the user may be notified that the media content item 230 (e.g., a full version of a movie) has been found in an electronic retail store and is available to view upon the user purchasing the media content item 230. Alternatively, the media content module 255 may determine that the media content item 230 has already been purchased by the user, and therefore, may provide the media content item 230 without requesting further payment. For example, the media content module 255 may determine that the user owns both a print version and a digital version of the same book.

The watch list module 260 may be configured to add media content items 230 (e.g., songs, music videos, books) to a watch list that is accessible from the user's device. In general, the watch list may include media content items 230 that interest the user (i.e., media content items 230 that the user has interacted with in the past and presumably wishes to interact with in the future). For example, the media content items 230 included in the watch list may be media content items 230 that the user has previously captured a portion of using a media capturing device. In one example, the watch list module 260 may indicate whether the user has already purchased the media content items 230 on the watch list. In addition, the watch list module 260 may provide additional information about each of the media content items 230, such as reviews, synopsis, similar items, etc. In one configuration, the watch list module 260 may enable a plurality of users to share watch lists with one another. The watch list module 260 may also generate advertisements and/or recommendations that are related to the media content items 230 on the user's watch list.

Certain processing modules may be discussed in connection with this technology and FIG. 2. In one example configuration, a module of FIG. 2 may be considered a service with one or more processes executing on a server or other computer hardware. Such services may be centrally hosted functionality or a service application that may receive requests and provide output to other services or customer devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

The computing device 210 may comprise, for example, a server computer or any other system providing computing capability. Alternatively, a plurality of computing devices 210 may be employed that are arranged, for example, in one or more server banks, computer banks or other computing arrangements. For example, a plurality of computing devices 210 together may comprise a cloud computing resource, virtualization server, a grid computing resource, and/or any other distributed computing arrangement. Such computing devices 210 may be located in a single installation or may be distributed among many different geographical locations. For purposes of convenience, the computing device 210 is referred to herein in the singular. Even though the computing device 210 is referred to in the singular, it is understood that a plurality of computing devices 210 may be employed in the various arrangements as described above.

The client 280 is representative of a plurality of client devices that may be coupled to the network 275. The client 280 may comprise, for example, a processor-based system such as a computer system. Such a computer system may be embodied in the form of a desktop computer, a laptop computer, personal digital assistants, cellular telephones, smartphones, set-top boxes, network-enabled televisions, music players, tablet computer systems, game consoles, electronic book readers, or other devices with like capability.

The client 280 may be configured to execute various applications such as a browser 282, and/or other applications 284. The applications 284 may correspond to code that is executed in the browser 282 (e.g., web applications). The applications 284 may also correspond to standalone applications, such as networked applications. In addition, the client 280 may be configured to execute applications 284 that include, but are not limited to, video playback applications, standalone applications, email applications, instant message applications, and/or other applications.

The client 280 may include or be coupled to an output device 286. The browser 282 may be executed on the client 280, for example, to access and render network pages (e.g. web pages) or other network content served up by the computing device 210 and/or other servers. The output device 286 may comprise, for example, one or more devices such as cathode ray tubes (CRTs), liquid crystal display (LCD) screens, gas plasma-based flat panel displays, LCD projectors, or other types of display devices, etc. In addition, the output device 286 may include an audio device, tactile device (e.g., braille machine) or another output device to feedback to a user.

Figure 3:
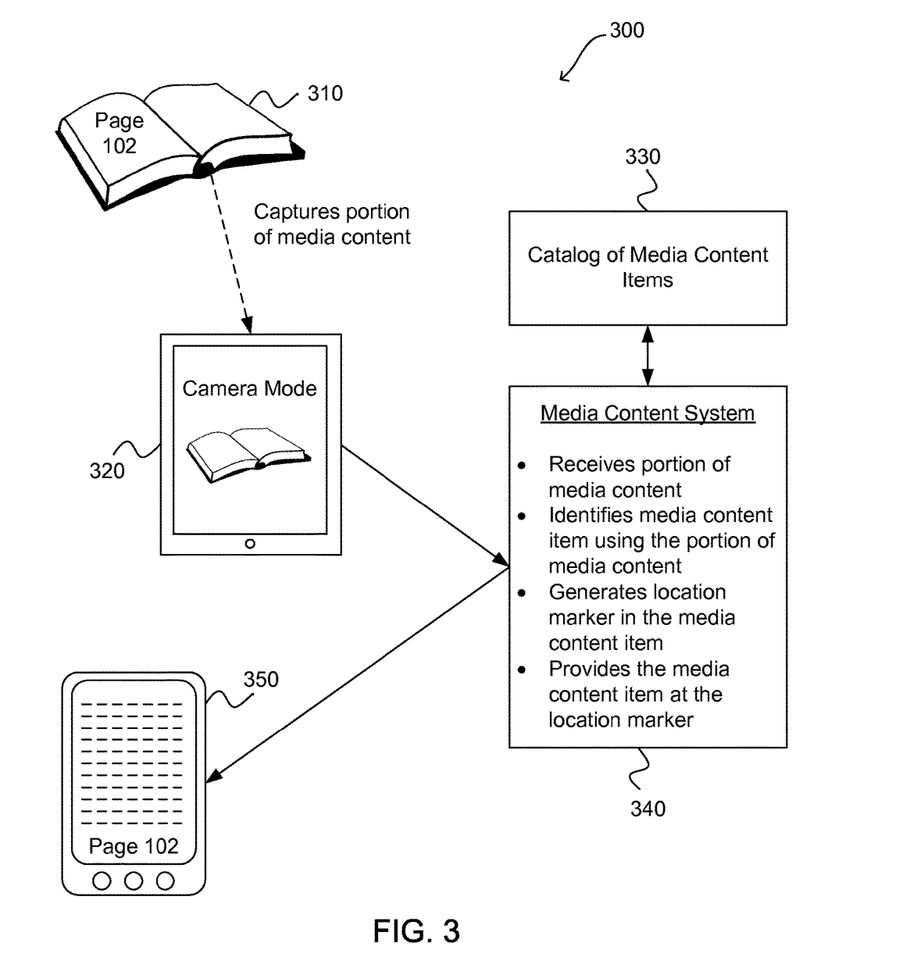
FIG. 3 is another system for capturing a portion of media content and providing a media content item with a location marker using the portion of media content according to an example of the present technology.

FIG. 3 illustrates an exemplary system 300 for capturing a portion of media content and providing a media content item using the portion of media content. A user may interact with media content, such as a book 310 in a print format. The user may stop reading the book at page 102 and desire to resume reading a digital version of the book at a later time (e.g., on an electronic reader 350). In one example, the user may have received the digital version of the book free of charge (or at a discount) when purchasing the print book 310 at an electronic retail store or a physical retail store. The user may initiate a camera mode on a tablet computer 320 by opening an application or program stored on the tablet computer 320. The user may capture an image of the book page (e.g., page 102) using the camera on the tablet computer 320. The image may contain a plurality of characters from the book page. The user may send the image of the book page, via the application or program stored on the tablet computer 320, to a media content system 340.

Alternatively, as discussed earlier, the user may interact with media content, such as music, video, etc. and desire to continue interacting with the media content at a later time. The user may initiate an audio recorder or a video recorder on the tablet computer 320. The user may record or capture an audio sample or a video sample of the media content. The audio file or video file may be sent, via the application or program stored on the tablet computer, to the media content system 340.

The media content system 340 may receive a portion of media content (e.g., the image file of the book page). The media content system 340 may identify a media content item using the portion of media content. For example, the media content item may include the portion of media content captured by the tablet computer 320. In one configuration, the media content system 340 may identify the media content item, in part, by analyzing the portion of media content using a variety of techniques and then matching the media content item to the portion of the media content. The technique used to analyze the portion of media content may depend on a file type (e.g., image file, audio file, video file) associated with the portion of media content. As indicated in FIG. 3, the media content system 340 may analyze the image file containing a plurality of characters (e.g., page 102 of the book 310) using optical character recognition (OCR). The media content system 340 may identify the text contained in the image file using OCR.

The media content system 340 may compare the extracted text with a catalog of media content items 330. The catalog of media content items 330 may include, but is not limited to, a plurality of digital books, digital magazines, digital newspapers, etc. The media content system 340 may search the catalog of media content items 330 for the text contained in the image file. The media content system 340 may subsequently identify a media content item (e.g., a digital book) that contains the same text as captured on page 102 of the book 310.

Alternatively, the media content system 340 may identify the media content item, in part, by analyzing the portion of media content using techniques such as audio recognition and video recognition. In one example, the media content system 340 may use audio recognition software to create an audio or acoustic fingerprint of the portion of media content. In general, the audio fingerprint may be a digital summary of audio attributes that are deterministically generated from an audio signal. The digital summary may include a virtual map of peaks and feature points of the audio attributes using parameters, such as frequency, intensity, and time. The media content system 340 may compare the audio fingerprint with audio items included in the catalog of media content items 330, and subsequently identify a media content item 330 that includes the same audio fingerprint as the portion of media content. As an additional example, the media content system 340 may use video recognition software to create a video fingerprint of the portion of media content. In general, the video fingerprint may be created based on a number of visual video features including, but not limited to, key frame analysis, color and motion changes during a video sequence, etc. The media content system 340 may compare the video fingerprint with video items included in the catalog of media content items 330, and subsequently identify a media content item that includes the same video fingerprint as the portion of media content. Alternatively, the media content system 340 may use audio and video recognition software that uses techniques other than audio and video fingerprinting to analyze the audio and video media content.

In one example, the media content system 340 may generate a location marker in the media content item to correspond to the portion of media content. For example, the location marker may correspond to the book page captured by the tablet computer 320 (e.g., page 102 of the book 310). The media content system 340 may provide the media content item (e.g., the digital book) at the location marker to the device 350 (e.g., the electronic reader). In other words, the media content system 340 may provide the user with the digital book starting from page 102. Thus, the user may seamlessly transition from reading page 102 of the print book 310 to reading page 102 of the digital book on the device 350.

In one configuration, the media content system 340 may include a plurality of computing devices for receiving the portion of media content, identifying the media content item using the portion of the media content, generating the location marker within the media content item, and providing the media content item at the location marker. In addition, the plurality of computing devices may be associated with one or more third parties. For example, a first party may identify the media content item and/or location marker and a second party may provide the media content item.

Figure 4:
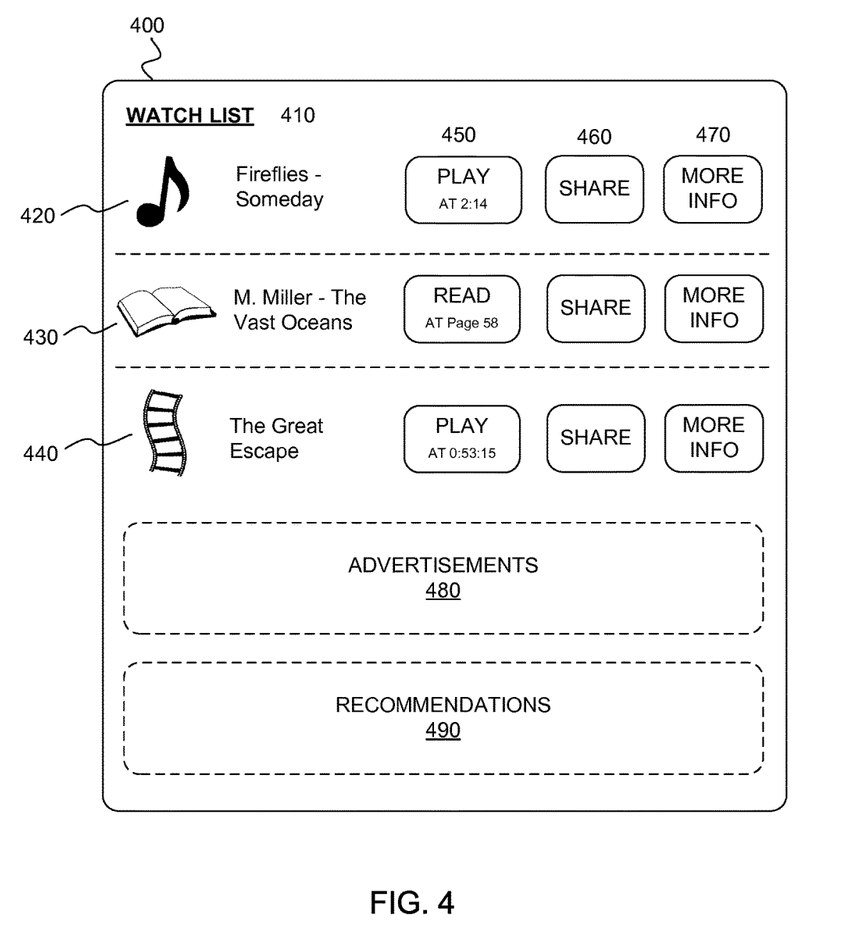
FIG. 4 is a watch list including media content items with a location marker according to an example of the present technology.

FIG. 4 is an exemplary user interface 400 showing a watch list 410. The watch list may include a plurality of media content items, such as a song 420, a digital book 430 and a video 440. In general, the watch list 410 may contain media content items that interest the user (i.e., interest items). In this example, the watch list may contain media content that has received user interaction (i.e., media content that is viewed, read, watched, or played) and the watch list 410 may contain media content items that the user previously captured a portion of using a device. For example, the user may have previously captured portions of the song 420, the digital book 430 and the video 440, and therefore, these media content items may be included in the watch list 410.

The user interface 400 may include interaction options 450 for the user to interact with the media content items. For example, the interaction options 450 may allow the user to play the song 420 or the video 440, as well as read the digital book 430 from the beginning of the media content items. In addition, the interaction options 450 may allow the user to interact with the media content starting from a location marker (e.g., the user may play the song 420 or video 440 starting from a particular time marker or read the digital book 430 starting from a particular page number). In one example, the user may select a share button 460 in order to share the media content items in the watch list 410 with a plurality of users. Therefore, the plurality of users may also interact with the media content starting from the location marker. In addition, the user may select an option 470 to access additional information about each of the media content items 420, 430 and 440. The additional information may include user reviews, synopsis, similar media content items, etc.

In one example, the watch list 410 may include advertisements 480 and/or recommendations 490. The advertisements 480 may be related to the media content items 420, 430 and 440 in the watch list 410. For example, advertisements 480 related to the song 420 or the digital book 430 (e.g., advertisements for an audio player, an electronic book reader, etc.) may be displayed to the user. Similarly, recommendations 490 for additional media content items that are related to the media content items 420, 430 and 440 in the watch list 410 may be displayed to the user. For example, the recommendations 490 may include additional songs by the same artist as the song 420, books by the same author as the book 430, or videos with the same actors or actresses as the video 440. In addition, the advertisements 480 and/or recommendations 490 may be related to the location markers within the media content items (e.g., the location marker of 2:14 at the media content item 420 or the location marker of page 58 at the media content item 430). For example, a particular product may be recommended for purchase at an electronic retail store that is discussed in page 58 of the book.

Figure 5:
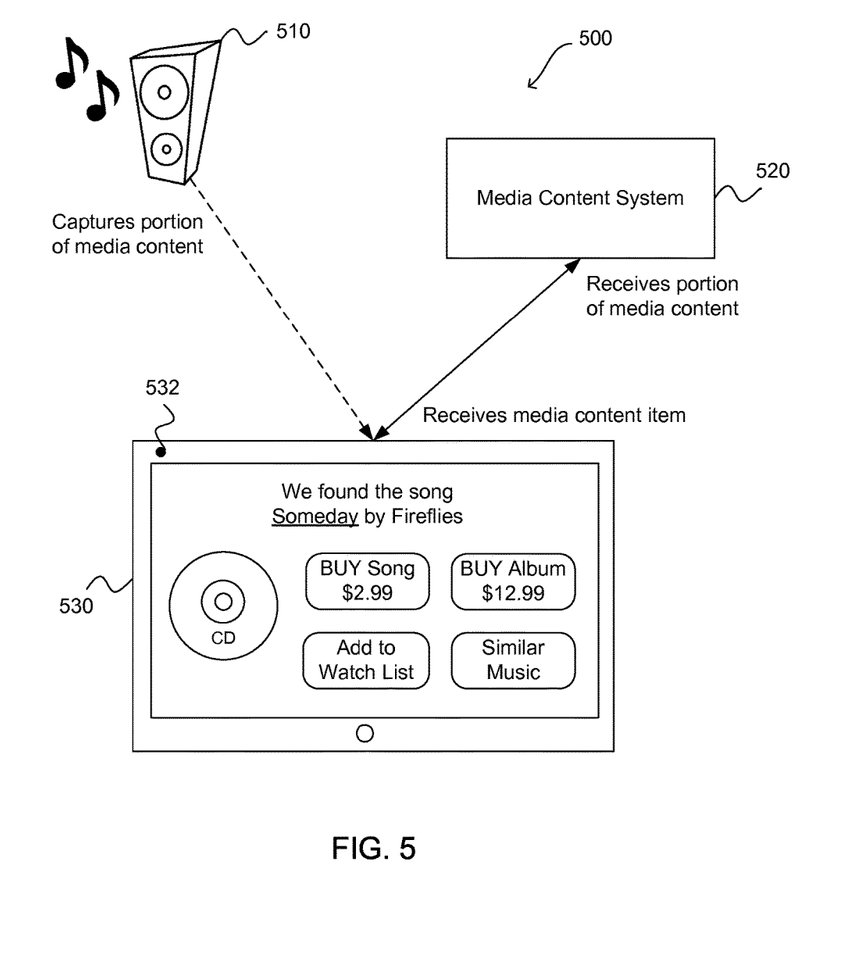
FIG. 5 illustrates a user interface displaying various options in relation to a media content item with a location marker that has been identified using a portion of media content according to an example of the present technology.

FIG. 5 illustrates a user interface displaying various options in relation to a media content item that has been identified using a portion of media content. A user device 530 with a microphone 532 may capture a portion of a song (e.g., a 10 second audio sample of the song) played at a speaker 510. The user device 530 may send the audio sample of the song to a media content system 520. The media content system 520 may identify the song based on the audio sample. As shown in FIG. 5, the media content system 520 may notify the user of the song name and artist at the user device 530. In one example, the media content system 520 may determine that the user has not purchased the song. Therefore, the media content system 520 may provide the song to the user device 530 upon the user purchasing or renting the song. The media content system 520 may provide options to purchase the song, purchase an album associated with the song, add the song or the album to the user's watch list, browse similar music, etc. Thus, the user interface may lead the user to an electronic retail store containing a plurality of similar media content items.

Alternatively, the media content system 520 may provide the song free or charge, or provide the song upon determining that the user has already purchased that particular song or pre-purchased a defined number of songs. As shown in FIG. 5, the user device 530 may capture the portion of media content, as well as play the media content item received from the media content system 520. In an alternative configuration, the device that captures the portion of media content may be different than the device that receives the media content item from the media content system 520.

Figure 6:
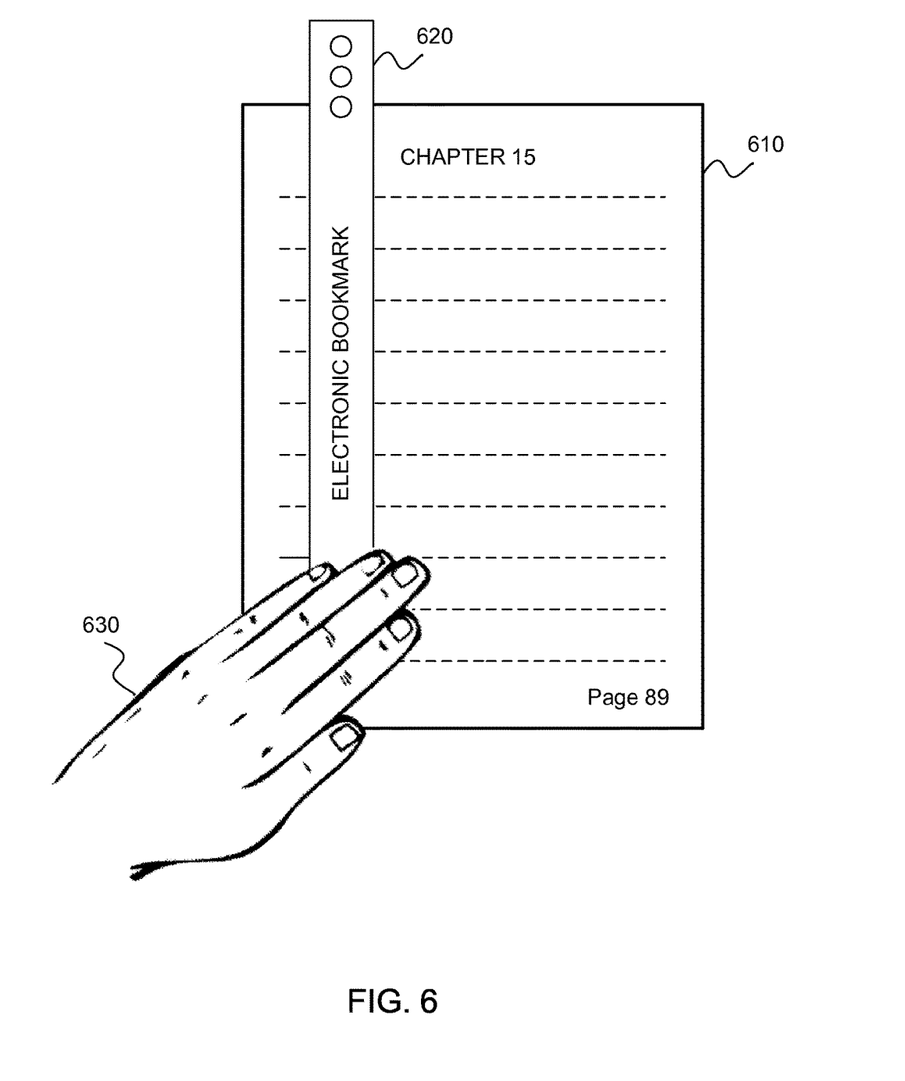
FIG. 6 illustrates an electronic bookmark for capturing a portion of media content according to an example of the present technology.

FIG. 6 illustrates an electronic bookmark 620 for capturing a portion of media content, such as a page from a printed document 610. The printed document 610 may include a book, magazine, newspaper, etc. The electronic bookmark 620 may include an image capturing device (e.g., a scanner bar or camera) to capture an image of the page. A user 630 may capture the image of the page, wherein the image includes a plurality of characters or photos from a magazine. In one example, the user 630 may scan the page using the electronic bookmark 620 using a hand powered traversal for the scanning operation. The electronic bookmark 620 may create an image file of the page and send the image file to a media content provider (not shown in FIG. 6). The media content provider may identify a digital version of the printed document, from a catalog of media content items, which may include the same text as contained in the image file. The media content provider may provide the digital version of the printed document to a user's device. Therefore, the user's location within the printed document 610 may be synced with the digital version of the document or media content. In addition, the electronic bookmark 620 may serve as a traditional bookmark to physically mark the user's current reading position in the printed document 610.

Figure 7:
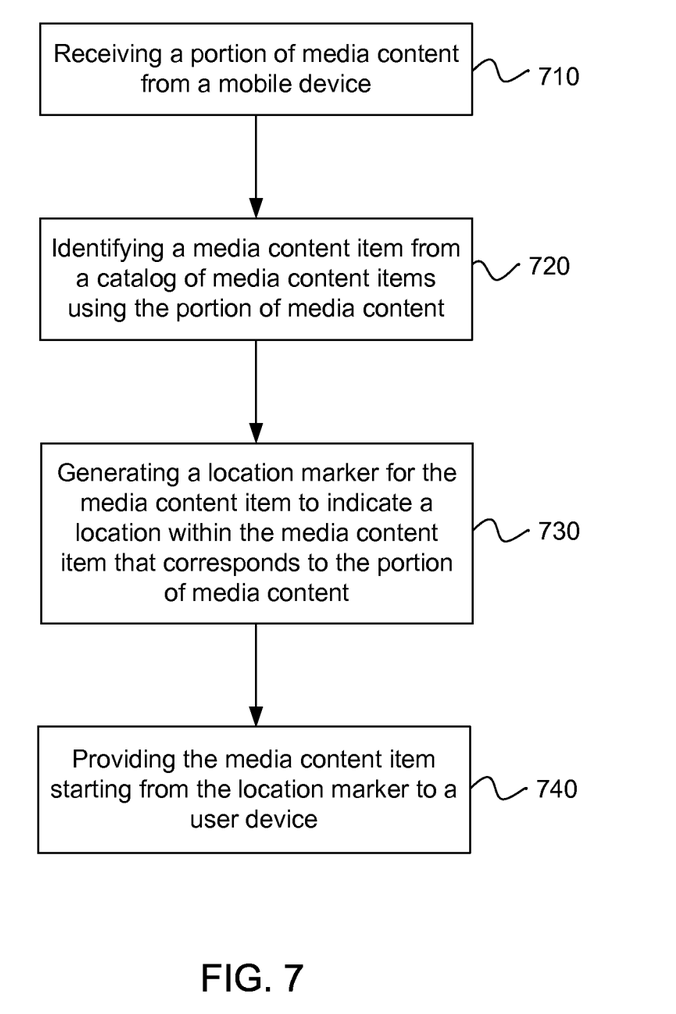
FIG. 7 is a flowchart of an example method for providing media content using a computing device.

FIG. 7 illustrates an example of a method for providing media content. A portion of media content may be received, as in block 710. The portion of media content may be associated with audio content, video content, graphical content, or textual content. For example, the portion of media content may include a portion of a song, audio book, movie, music video, television program, book, magazine, newspaper, etc. In one example, the portion of media content may be received from a media capturing device, such as a cell phone or laptop computer.

A media content item may be identified from a catalog of media content items using the portion of media content, as in block 720. The media content item may be identified by, in part, analyzing the portion of media content using audio recognition, video recognition, or optical character recognition (OCR). The portion of media content may be compared with the catalog of media content items in order to identify the corresponding media content item.

A bookmark may be generated for the media content item to indicate a location within the media content item that corresponds to the portion of media content, as in block 730. For example, the bookmark may point to a specific location (e.g., page 45) within the media content item that corresponds to the portion of media content captured by the media capturing device. As another example, the portion of media content may include video from a time marker of 0:13:13 to the time marker of 0:13:28. Therefore, the bookmark may start at the beginning of the portion of media content (i.e., the time marker of 0:13:13) or alternatively, at the end of the portion of media content (i.e., 0:13:28).

The media content item may be provided to a user device starting from the bookmark, as in block 740. In addition, the media content item may be provided starting from the bookmark in response to receiving a payment for purchase or rental of the media content item. In one configuration, the media content item may be added to a watch list that is accessible from the user device.

Figure 8:
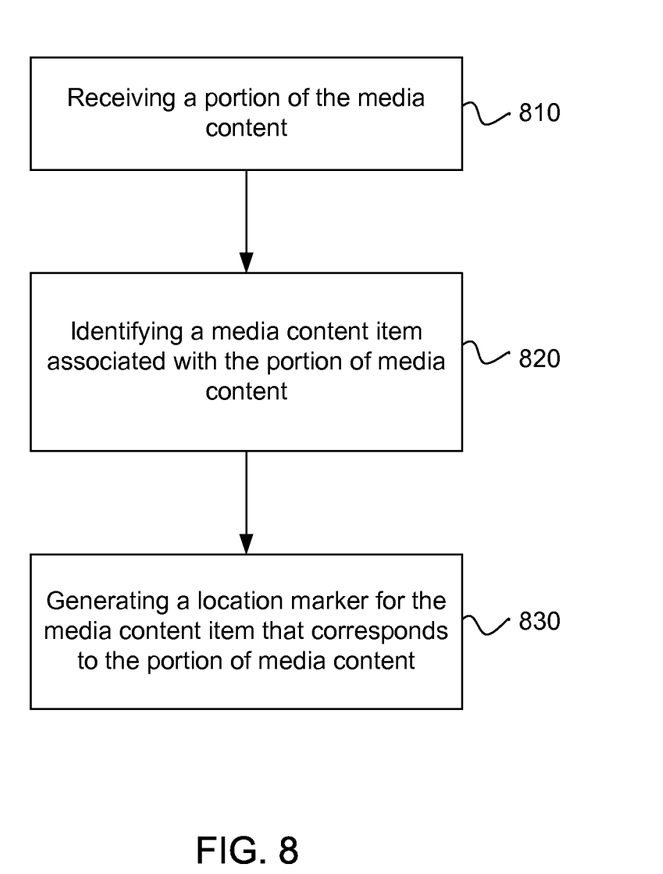
FIG. 8 is a flowchart of an additional example method for providing media content using a computing device.

FIG. 8 illustrates another example of a method for providing media content. A portion of media content may be received, as in block 810. The portion of media content may be received as an audio file, a video file, or an image file containing a plurality of characters. In one example, the image file containing the plurality of characters may be associated with a printed book. In addition, the portion of media content may be received from a media capturing device having a microphone or a camera to capture the portion of media content.

A media content item associated with the portion of media content may be identified, as in block 820. The media content item may be associated with audio content, video content, graphical content, or textual content. In addition, the portion of media content may be analyzed using various techniques, such as optical character recognition (OCR), audio recognition, or video recognition. The portion of media content may be compared to a plurality of media content items in the catalog of media content items. The media content item may be identified from the catalog of media content items using the portion of media content.

A location marker may be generated for the media content item that corresponds to the portion of media content, as in block 830. In other words, the location maker may indicate a location within the media content item that corresponds to the portion of media content. The media content item may be provided at the location marker to a user device, or in other words, consumption may be set to start as defined by the portion of media content. In one example, the media content item may be provided to start consumption at the location marker in response to receiving a payment for purchase or rental of the media content item. Alternatively, the media content item may be automatically provided to the user because the user may have previously purchased or rented the media content item. In one configuration, the media content item may be added to a list of interest items, wherein the list of interest items is accessible from the user device. The list of interest items may be included in a watch list.

The media content item identification along with the location marker may be shared with a plurality of users. Thus, the user may share an interesting or exciting media content item with the location marker, so that the plurality of users may interact with the media content item starting from the same location marker as the user.

Figure 9:
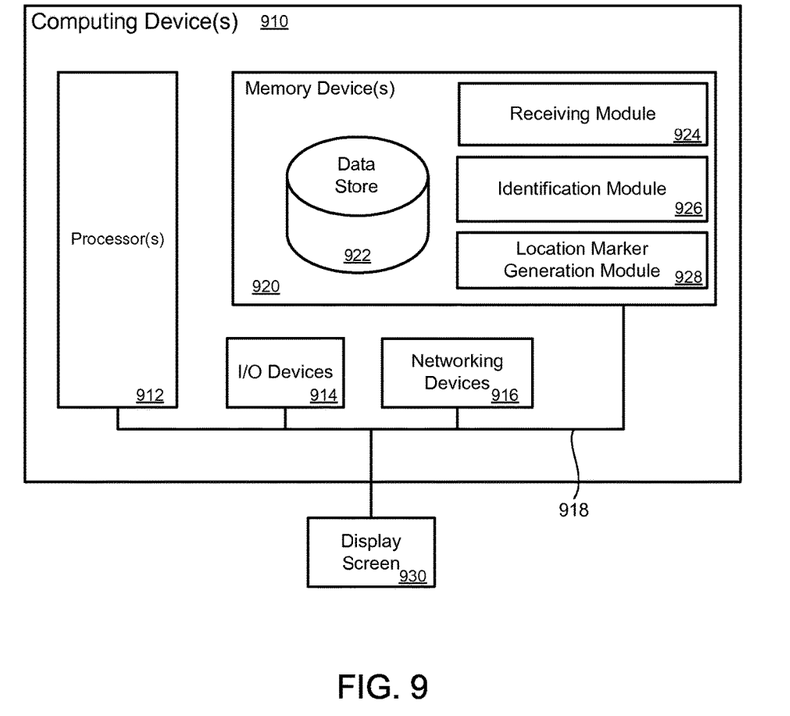
FIG. 9 is a block diagram that provides an example illustration of a computing device that may be employed in the present technology.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device may include a local communication interface 918 for the components in the computing device. For example, the local communication interface may be a local data bus and/or any related address or control busses as may be desired.

The memory device 920 may contain modules that are executable by the processor(s) 912 and data for the modules. Located in the memory device 920 are modules executable by the processor. For example, a receiving module 924, an identification module 926, a location marker generation module 928, and other modules may be located in the memory device 920. The modules may execute the functions described earlier. A data store 922 may also be located in the memory device 920 for storing data related to the modules and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen 930 that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium having instructions embodied thereon, the instructions being executable by one or more processors to perform acts comprising:

receiving, using one or more processors at a server, a portion of media content from a user device, wherein the portion of media content is captured at the user device using at least one of a camera, a microphone or a video recorder that is included in the user device, and the portion of media content is provided from the user device over a network to the server;

identifying, using the one or more processors at the server, a media content item from a catalog of media content items that includes the portion of media content received from the user device, wherein the media content item is identified from the catalog of media content items by applying at least one of audio recognition, video recognition or optical character recognition (OCR) to the portion of media content;

generating, using the one or more processors at the server, a media content file marker for the media content item to indicate a time or position within the media content item that corresponds to the portion of media content received from the user device; and providing, using the one or more processors at the server, the media content item starting from the media content file marker over the network to the user device.

2. The non-transitory machine readable storage medium of claim 1, further comprising adding the media content item to a watch list that is accessible from the user device.

3. The non-transitory machine readable storage medium of claim 1, further comprising providing the media content item starting from the media content file marker in response to receiving a payment for purchase or rental of the media content item.

4. The non-transitory machine readable storage medium of claim 1, wherein the portion of media content is associated with audio content, video content, graphical content, or textual content.

5. The non-transitory machine readable storage medium of claim 1, wherein identifying the media content item comprises analyzing the portion of media content using the audio recognition or the OCR.

6. A method for providing media content, the method comprising:
receiving, using one or more processors at a server, a portion of the media content captured at a user device using at least one of a camera, a microphone or a video recorder that is included in the user device, and the portion of media content is provided from the user device over a network to the server;
identifying, using the one or more processors at the server, a media content item that includes the portion of media content received from the user device, wherein the media content item is identified by applying at least one of audio recognition, video recognition or optical character recognition (OCR) to the portion of media content; and
generating, using the one or more processors at the server, a media content file marker for the media content item, and the media content file marker indicates a time or position within the media content item that corresponds to the portion of media content received from the user device.

7. The method of claim 6, further comprising providing the media content item to be consumed at the media content file marker to the user device.

8. The method of claim 6, further comprising adding the media content item to a list of interest items, the list of interest items being accessible from the user device.

9. The method of claim 8, wherein the list of interest items are included in a watch list.

10. The method of claim 6, further comprising:
determining a fingerprint of the portion of media content using audio recognition or optical character recognition (OCR);
comparing the fingerprint with fingerprints associated with a plurality of media content items; and
identifying the media content item at the media content file marker using the fingerprint of the portion of media content.

11. The method of claim 6, further comprising receiving the portion of media content as an audio file, a video file, or an image file containing a plurality of characters.

12. The method of claim 6, further comprising identifying the time or position within the media content item that corresponds to the portion of media content.

13. The method of claim 7, further comprising receiving the portion of media content from a media capturing device having an audio recorder or a camera to capture the portion of media content.

14. The method of claim 9, further comprising sharing the media content item with the media content file marker from the watch list with a plurality of users.

15. The method of claim 6, further comprising providing advertisements related to the media content file marker within the media content item.

16. The method of claim 6, further comprising providing recommendations for additional media content items related to the media content file marker within the media content item.

17. A system for providing media content, the system comprising:
a processor;
a memory device including a data store to store a plurality of data and instructions that, when executed by the processor, cause the system to:
receive a portion of media content captured by a user device using at least one of a camera, a microphone or a video recorder that is included in the user device;
identify a media content item from a catalog of media content items that includes the portion of media content received from the user device, wherein the media content item is identified by applying at least one of audio recognition, video recognition or optical character recognition (OCR) to the portion of media content;
generate a media content file marker in the media content item to indicate a time or position within the media content item that corresponds to the portion of media content received from the user device; and
provide the media content item starting from the media content file marker over a network to the user device.

18. The system of claim 17, wherein the plurality of data and instructions that, when executed by the processor, further cause the system to add the media content item to a watch list that is accessible from the user device.

19. The system of claim 17, wherein the plurality of data and instructions that, when executed by the processor, further cause the system to receive the portion of media content from a media capturing device having an audio recorder or a camera to capture the portion of media content.

20. The system of claim 17, wherein the plurality of data and instructions that, when executed by the processor, further cause the system to provide the media content item at the media content file marker in response to receiving a payment for purchase or rental of the media content item.

* * * * *